H. T. HALLOWELL.
SHAFT COLLAR.
APPLICATION FILED AUG. 1, 1908.
1,045,283.
Patented Nov. 26, 1912.
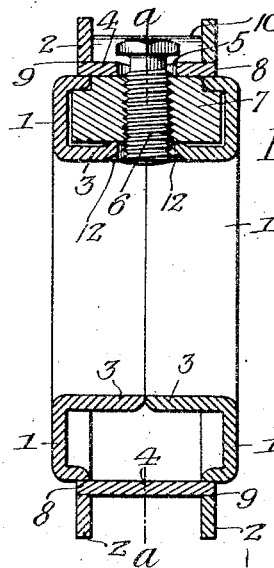
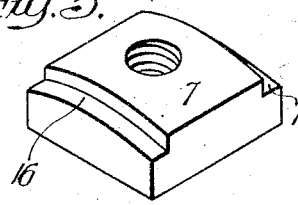
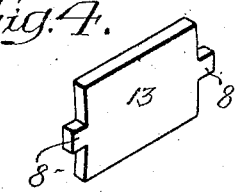
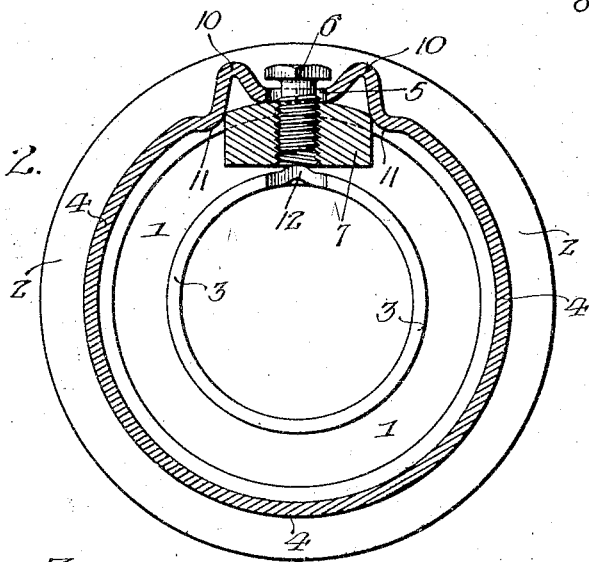
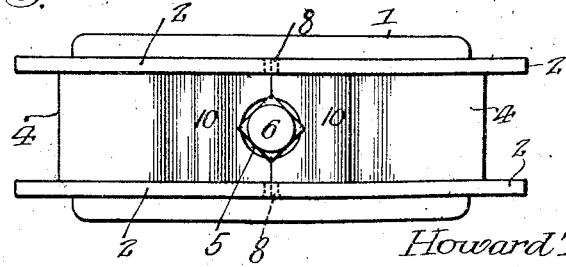
Witnesses:
Inventor:
Howard T. Hallowell
by his Attorneys
Howson & Howson

UNITED STATES PATENT OFFICE.

HOWARD T. HALLOWELL, OF PHILADELPHIA, PENNSYLVANIA, ASSIGNOR TO STANDARD PRESSED STEEL COMPANY, OF PHILADELPHIA, PENNSYLVANIA, A CORPORATION OF PENNSYLVANIA.

SHAFT-COLLAR.

1,045,393.

Specification of Letters Patent.

Patented Nov. 26, 1912.

Application filed August 1, 1908. Serial No. 446,477.

*To all whom it may concern:*

Be it known that I, HOWARD T. HALLOWELL, a citizen of the United States, residing in Philadelphia, Pennsylvania, have invented certain Improvements in Shaft-Collars, of which the following is a specification.

My invention relates to the construction of an annulus, such as a shaft collar; and the object of my invention is to form a shaft collar of a plurality of sheet metal members pressed into the desired shape and so constructed as to maintain in proper position a suitable nut or other support through which a set screw is passed for normally retaining such annulus or collar in place upon a shaft or other similar element.

A further object of my invention is to provide a shaft collar made up of a pair of cupped shells or sections of similar contour with retaining means to which they are riveted for holding the same together; such retaining means being preferably an annular band, continuous or otherwise, and properly disposed with regard to the shells or sections forming the collar.

My present invention, which is, in part, a division of my application for patent filed March 20, 1908, Serial No. 422,318, (patented Aug. 4, 1908, No. 895,409,) refers particularly to structures secured together by means of an annular band riveted to a pair of sections of the same contour, having peripheral walls or flanges with adjacent or abutting edges, forming the collar, though, as will be readily understood, other means of securing said band to the sections to maintain then in proper relative position may be employed and they are within the scope of my invention.

These and other features of my invention are more fully described hereinafter, reference being had to the accompanying drawings, in which:

Figure 1, is a vertical sectional view of a shaft collar embodying my invention; Fig. 2, is a sectional view of the same, taken on the line a—a, Fig. 1; Fig. 3, is a plan view of the structure shown in Figs. 1 and 2, and Figs. 4 and 5, are views illustrating details of my invention.

The structure forming the subject of my invention comprises a plurality of sections or blanks of sheet metal pressed into shape to form an annular member with shaft engaging portions; the sections of such member being provided with peripheral walls forming a shaft engaging sleeve. The structure so made incloses a hollow annular space; the sections forming the same being so disposed as to provide mutual connection and support and having portions of the metal comprising the same displaced so as to confine in proper relative position, a suitable nut for the set screw employed with such collars.

In the structure shown in Figs. 1 and 2, I provide a pair of members, L-shaped in cross-section, which are combined and secured together to form an annulus or collar. These sections have side walls 1, with outwardly extending offset portions 2, and inner peripheral walls or flanges 3. In order to secure this collar together, I provide an annular band or sleeve 4 disposed in such position with regard to the sections as to form a hollow annular space between it, the side walls, and the inner peripheral walls or flanges of said sections; such sleeve or band being apertured at 5 for the passage of a set screw 6 which enters a nut 7 disposed in the hollow annular space and confined in proper relative position. In order to confine the sections of the collar in position by the annular sleeve, the latter is provided with spuds 8 arranged to enter apertures 9 in the offset portions 2 of the side walls of the sections and be riveted thereto, in the manner clearly shown in the drawings; such action binding the sections together and holding them against displacement. If desired, the sleeve or band 4 may be brazed, electrically welded, or otherwise permanently secured to the sections.

The securing sleeve or band 4 is continuous and may be formed into the necessary shape from a flat strip, the meeting ends or edges of which abut and may or may not be secured by brazing or other desirable means. In addition this band is provided with the bent up portions 10 which form guards for the head of the set screw. These bent up portions may also extend inwardly from the sleeve or band 4 so as to provide portions 11 for engagement with the sides of the nut and retain the latter in proper place. As an additional retaining means for the nut, the inner peripheral wall of the collar adjacent the aperture for the set screw is struck up at 12 to form projections to engage the nut.

Instead of employing an annular band or sleeve, such as 4, I may use small plates 13, such as illustrated in the perspective view, Fig. 4, for the purpose of securing the sections of the collar together, or rivets of the ordinary type may be employed. All of the sections forming the collar have their corners rounded.

In some instances it may be desirable to provide a nut entirely filling the annular space between the inner peripheral wall or flange of the collar and the outer peripheral wall or flange of the same, and such nut I have shown in Fig. 5, and in use in Figs. 1 and 2. It is provided with recessed portions 16 to accommodate the contour of the side walls of the collar.

In completing the annulus or shaft collar, the members of the same are assembled in a suitable manner; the nut being properly positioned and maintained in place by means of the set screw 6, or a suitable pin which is passed through the apertures of the several members, and then the members are riveted together, the nut having been positioned by displacing the metal of the peripheral wall of one of the members relatively thereto, in the manner described.

I may, if desired, in addition to the riveting, braze or electrically weld any and all of the abutting faces of the several forms of structures shown herein, and I may further harden the side wall or face of the respective collars which comes opposite the work.

The apertures in the collar receiving the set screws are preferably countersunk or bored to accommodate the heads of the set screws so that the latter will not project radially beyond the peripheral face of the same. The side walls project beyond the outer peripheral wall and form a guard for the head of the set screw, so that counterboring of the outer peripheral wall is unnecessary. An additional guard is formed by bending the band or sleeve securing the sections together.

It is desirable to prevent rattling of the nut in the finished collar, and to accomplish this end, the finished collar may be placed in a die and a depression, indicated at 12, may be formed in the inner peripheral walls adjacent the aperture for the passage of the set screw. By this means a seat is formed for the nut and the latter is held firmly between the same and the outer peripheral wall.

I claim:

1. The combination of a pair of sheet metal sections of similar contour, an annular band securing said sections together, the latter having flanges which form with said band a hollow annular space, a nut having a curved surface disposed in said hollow annular space and lying against said band, a set screw for said nut, the side walls of said structure extending outwardly beyond the head of the set screw and forming a guard for the same, and the band having bent portions lying at right angles to the side walls and guarding the set screw head.

2. The combination of a pair of sheet metal sections of similar contour having side walls and peripheral walls or flanges, an annular band to which said sections are secured, a nut mounted within said collar, a set screw for said nut, the collar being apertured for its passage, and ribs formed in said annular band and serving as guards for the head of said set screw.

3. The combination of a pair of sheet metal sections of similar contour having side walls with offset portions and peripheral walls or flanges, an annular band to which the offset portions of said side walls are secured, a nut mounted within said collar and abutting said band, a set screw for said nut, the collar being apertured for its passage, ribs formed in said annular band and serving as guards for the head of said set screw, the nut being recessed to accommodate the offset portions of the side walls, ribs carried by the band in engagement with the nut, and projections carried by the peripheral flanges of the sections for engagement with said nut.

In testimony whereof, I have signed my name to this specification, in the presence of two subscribing witnesses.

HOWARD T. HALLOWELL.

Witnesses:
 MURRAY C. BOYER,
 JOS. H. KLEIN.